United States Patent
Alonso et al.

(10) Patent No.: US 10,147,107 B2
(45) Date of Patent: Dec. 4, 2018

(54) SOCIAL SKETCHES

(71) Applicant: MICROSOFT TECHNOLOGY LICENSING, LLC, Redmond, WA (US)

(72) Inventors: Omar Alonso, Redwood Shores, WA (US); Serge-Eric Tremblay, San Jose, WA (US); Vasileios Kandylas, Sunnyvale, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 468 days.

(21) Appl. No.: 14/752,781

(22) Filed: Jun. 26, 2015

(65) Prior Publication Data

US 2016/0379232 A1   Dec. 29, 2016

(51) Int. Cl.

| | |
|---|---|
| G06Q 30/00 | (2012.01) |
| G06Q 10/00 | (2012.01) |
| G06Q 30/02 | (2012.01) |
| G06F 17/30 | (2006.01) |
| G06Q 50/00 | (2012.01) |

(52) U.S. Cl.
CPC ... *G06Q 30/0204* (2013.01); *G06F 17/30064* (2013.01); *G06F 17/30867* (2013.01); *G06Q 10/00* (2013.01); *G06Q 50/01* (2013.01)

(58) Field of Classification Search
CPC .......... G06F 17/00–17/50; G06Q 10/00–50/00
USPC ................................................ 705/7.11–7.42
See application file for complete search history.

(56) References Cited

U.S. PATENT DOCUMENTS

| | | | |
|---|---|---|---|
| 7,657,523 B2 | 2/2010 | Ebanks | |
| 8,676,565 B2 * | 3/2014 | Larcheveque | ...... G06F 17/2785 704/1 |
| 8,799,276 B1 | 8/2014 | Hyatt et al. | |
| 8,805,844 B2 | 8/2014 | Schorzman et al. | |
| 9,196,245 B2 * | 11/2015 | Larcheveque | ...... G06F 17/2785 |
| 9,230,031 B2 * | 1/2016 | Ickman | ............. G06F 17/30867 |

(Continued)

FOREIGN PATENT DOCUMENTS

WO    2014088968 A1    6/2014

OTHER PUBLICATIONS

Aggarwal, Charu C., and Haixun Wang. "Text mining in social networks." Social network data analytics. Springer, Boston, MA, 2011. 353-378. (Year: 2011).*

(Continued)

*Primary Examiner* — Alan S Miller
(74) *Attorney, Agent, or Firm* — Jeffrey L Ranck; Ranck IP Law

(57) ABSTRACT

Systems and methods for generating a social sketch from social communications are provided. Unlike a typical summary of a subject (or of multiple subjects), a social sketch represents a "snapshot" summary of the social communications of people during a given period of time. The social sketch is generated by obtaining a corpus of social communications and filtering the social communications according to time. The filtered results are clustered according to the subject matter/topics of the social communications. Selected clusters are identified and the topic, representative high-quality social communications from non-experts and experts are extracted from each of the selected clusters and saved as a social sketch corresponding to the time period.

16 Claims, 11 Drawing Sheets

(56) References Cited

U.S. PATENT DOCUMENTS

| | | | |
|---|---|---|---|
| 9,373,146 B2* | 6/2016 | Yan | G06Q 50/01 |
| 2004/0093321 A1* | 5/2004 | Roustant | G06F 17/30867 |
| 2006/0282336 A1 | 12/2006 | Huang | |
| 2007/0118802 A1 | 5/2007 | Gerace et al. | |
| 2007/0143300 A1* | 6/2007 | Gulli | G06F 17/30551 |
| 2007/0214097 A1 | 9/2007 | Parsons et al. | |
| 2008/0010253 A1* | 1/2008 | Sidhu | G06F 17/30398 |
| 2008/0044016 A1* | 2/2008 | Henzinger | G06F 17/2211 |
| | | | 380/201 |
| 2008/0077569 A1* | 3/2008 | Lee | G06F 17/30713 |
| 2008/0255977 A1 | 10/2008 | Altberg et al. | |
| 2009/0006469 A1* | 1/2009 | Jain | G06Q 30/02 |
| 2009/0112678 A1* | 4/2009 | Luzardo | G06N 5/02 |
| | | | 705/7.38 |
| 2011/0167054 A1* | 7/2011 | Bailey | G06F 17/30864 |
| | | | 707/710 |
| 2011/0238409 A1* | 9/2011 | Larcheveque | G06F 17/2785 |
| | | | 704/9 |
| 2011/0246920 A1 | 10/2011 | Lebrun | |
| 2011/0307425 A1* | 12/2011 | Wang | G06F 17/30247 |
| | | | 706/12 |
| 2011/0307791 A1 | 12/2011 | Pierre et al. | |
| 2012/0016857 A1 | 1/2012 | Gross et al. | |
| 2012/0078612 A1* | 3/2012 | Kandekar | G06F 17/2745 |
| | | | 704/9 |
| 2012/0166931 A1* | 6/2012 | Alonso | G06Q 30/0201 |
| | | | 715/234 |
| 2012/0179449 A1* | 7/2012 | Raskino | G06F 17/30719 |
| | | | 704/2 |
| 2012/0209832 A1* | 8/2012 | Neystadt | G06Q 50/01 |
| | | | 707/723 |
| 2012/0254188 A1* | 10/2012 | Koperski | G06F 17/30663 |
| | | | 707/740 |
| 2012/0299925 A1* | 11/2012 | Najork | G06T 11/206 |
| | | | 345/440 |
| 2013/0073972 A1* | 3/2013 | Yung | G06Q 50/01 |
| | | | 715/738 |
| 2013/0085745 A1* | 4/2013 | Koister | G06F 17/2785 |
| | | | 704/9 |
| 2014/0046961 A1 | 2/2014 | Buchheit et al. | |
| 2014/0156624 A1* | 6/2014 | Alonso | G06Q 50/01 |
| | | | 707/708 |
| 2014/0200891 A1* | 7/2014 | Larcheveque | G06F 17/2785 |
| | | | 704/243 |
| 2014/0279798 A1* | 9/2014 | Purohit | G06Q 10/101 |
| | | | 706/47 |
| 2015/0039603 A1* | 2/2015 | Alonso | G06Q 10/06 |
| | | | 707/728 |
| 2015/0081725 A1* | 3/2015 | Ogawa | G06F 17/30595 |
| | | | 707/754 |
| 2015/0120721 A1* | 4/2015 | Kim | G06F 17/3053 |
| | | | 707/728 |

OTHER PUBLICATIONS

Ehrlich, Kate, Ching-Yung Lin, and Vicky Griffiths-Fisher. "Searching for experts in the enterprise: combining text and social network analysis." Proceedings of the 2007 international ACM conference on Supporting group work. ACM, 2007. (Year: 2007).*

Lin, Ching-Yung, et al. "Smallblue: Social network analysis for expertise search and collective intelligence." Data Engineering, 2009. ICDE'09. IEEE 25th International Conference on. IEEE, 2009. (Year: 2009).*

"International Search Report and Written Opinion Issued in PCT Application No. PCT/US2016/039137", dated Sep. 13, 2016, 10 Pages.

Marcus, et al., "TwitInfo: Aggregating and Visualizing Microblogs for Event Exploration", In Proceedings of the SIGCHI Conference on Human Factors in Computing Systems, May 7, 2011, 11 pages.

Coleman, Bernadette, "The Complete List of Engaging Content Ideas", Published on: Mar. 7, 2014 Available at: http://www.searchenginejournal.com/complete-list-engaging-content-ideas/91449/.

Leuski, et al., "iNeATS: Interactive Multi-Document Summarization", In Proceedings of the 41st Annual Meeting on Association for Computational Linguistics—vol. 2, Jul. 7, 2003, 4 pages.

Brennand, Sam, "6 Free Tools to Help You Find the Right Twitter Conversations", Published on: Jul. 22, 2013 Available at: http://www.vapartners.ca/6-free-tools-twitter-conversations/.

"Second Written Opinion Issued in PCT Application No. PCT/US2016/039137", dated Jun. 2, 2017, 7 Pages.

"International Preliminary Report on Patentability Issued in PCT Application No. PCT/US2016/039137", dated Oct. 11, 2017, 8 Pages.

* cited by examiner

SOCIAL SKETCHES

BACKGROUND

More and more, people are communicating with others in the online social networking services. For example, the social networking service, Twitter, reports that its users post or repost at least 400 million "tweets" each day. Similarly, the social networking service, Facebook, reports that there are 936 million active users each day, each interacting with others via posts and messages. Indeed, the volume of social communications that occur within all of the social networking services is staggering.

Naturally, the subject of the social communications is dynamic, often, but not exclusively, driven by current events. As a consequence, a topic that might be treated by a large number of the people in the social sphere (those communicating online via one or more social networking services) typically enjoys only fleeting popularity.

SUMMARY

The following Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

According to aspects of the disclosed subject matter, systems and methods for generating a social sketch from social communications are provided. Unlike a typical summary of a subject (or of multiple subjects), a social sketch represents a "snapshot" summary of the social communications of people during a given period of time. The social sketch is generated by obtaining a corpus of social communications and filtering the social communications according to time. The filtered results are clustered according to the subject matter/topics of the social communications. Selected clusters are identified and the topic and, representative high quality social communications from non-experts and experts are extracted from each of the selected clusters and saved as a social sketch corresponding to the time period.

According to additional aspects of the disclosed subject matter, a method for generating a social sketch corresponding to a time period in response to a request is presented. Indeed, in response to the request, social communications are obtained from a social networking service, wherein the social communications include social communications generated during the time period. The obtained social communications are filtered according to the time period such that the filtered social communications correspond to the social communications that were generated during the time period. The filtered social communications are then clustered according to the topics/subject matter of the social communications to generate a plurality of clusters of filtered social communications, each corresponding to a topic. A set of clusters of the plurality of clusters of social communications is identified. Each of the identified clusters of the set of the plurality of clusters of social communications is considered an identified cluster. For each identified cluster, a topic is extracted from the identified cluster according to the subject matter of the social communications of the identified cluster. Additionally, a non-expert set of high-quality communications is identified from the identified cluster. The non-expert set of high-quality communications corresponds to social communications of non-experts on the topic of the identified cluster. Similarly, an expert set of high-quality communications from the identified cluster is identified. The expert set of high-quality communications corresponds to social communications of experts on the topic of the identified cluster. The topic, the non-expert set of high-quality communications, and the expert set of high-quality communications comprise a cluster set for the identified cluster. The cluster sets of each of the identified clusters are stored as the social sketch corresponding to the identified time period.

According to further aspects of the disclosed subject matter, a computer-readable medium bearing computer-executable instructions for carrying out a method of generating a social sketch corresponding to a time period in response to a request is presented. The method comprises at least obtaining social communications from a social networking service. According to at least one embodiment, the social communications include social communications generated during a time period. The obtained social communications are filtered according to the time period. The result of the filtering is that the filtered social communications correspond to the social communications generated during the time period. The filtered social communications are then clustered according to the subject matter of the social communications to generate a plurality of clusters of filtered social communications. Thereafter, a set of clusters of the plurality of clusters of social communications is identified. Each of the clusters of the set of the plurality of clusters of social communications is considered an identified cluster. Subsequently, for each of the identified clusters, a topic from the identified cluster is extracted. The topic is extracted according to the subject matter of the social communications of the identified cluster. Additionally, a representative image of the identified cluster is identified from the social communications of the identified cluster. A non-expert set of high-quality communications is identified from the identified cluster. The non-expert set of high-quality communications corresponds to social communications of non-experts on the topic of the identified cluster. Similarly, an expert set of high-quality communications from the identified cluster is identified. The expert set of high-quality communications corresponds to social communications of experts on the topic of the identified cluster. Still further, the social communications of the identified cluster are re-clustered. A set of sub-clusters of the identified cluster is identified and a sub-topic from each of the identified sub-clusters of the set of sub-clusters is extracted. The topic, the non-expert set of high-quality communications, the expert set of high-quality communications, the extracted sub-topics, and the representative image comprise a topic set of the identified cluster. The cluster sets of each of the identified clusters are stored as the social sketch corresponding to the identified time period.

According to still further aspects of the disclosed subject matter, a computer-implemented method for providing a targeted social sketch in response to a request is provided. The method comprises receiving a request for a targeted social sketch corresponding to a first topic and a time period. Social communications from one or more social networking services are accessed. The social communications are filtered according to the time period, the filtered results being social communications generated during the time period. The social communications are then clustered according to topics as found in the subject matter of the social communications. A cluster of social communications corresponding to the first topic is identified. Additionally, a non-expert set of high-quality communications from the identified cluster is identified. The non-expert set of high-quality communications corresponds to social communications of non-experts on the first topic of the identified cluster. Similarly, an expert set of high-quality communications from the identified cluster is identified, where the expert set of high-quality communications corresponds to social communications of experts on the first topic of the identified cluster. The targeted social sketch is then stored. The targeted social sketch comprises the first topic, the non-expert set of high-quality communications, and the expert set of high-quality communications. Thereafter, a targeted social sketch presentation according to the targeted social sketch is generated and returned for presentation to a requesting party.

According to further aspects of the disclosed subject matter, a computing device configured to generate a social sketch is presented. The computing device comprises a process and a memory, where the processor executes instructions stored in the memory as part of or in conjunction with additional components to generate a social sketch from a corpus of social communications. The additional components of the computing device include a social sketch generator, a clustering module and a social sketch data store. In operation, in response to an instruction to generate a social sketch for a specified time period, the social sketch generator accesses a corpus of social communications, including social communications generated during the specified time period. The social sketch generator filters the corpus of social communications according to the specified time period, the results being social communications corresponding to the specified time period. The social sketch generator causes the clustering module to cluster the filtered social communications. The social communications are clustered according to the topics/subject matter of the social communications. The social sketch generator then selects certain of the clusters and extracts information, cluster sets, from each of the selected clusters and stores the cluster sets as a social sketch for the specified time period.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

For purposes of clarity and definition, the term "exemplary," as used in this document, should be interpreted as serving as an illustration or example of something, and it should not be interpreted as an ideal and/or a leading illustration of that thing. Additionally, when a word or term is followed by "(s)", the meaning should be interpreted as indicating the singular or the plural form of the word or term, depending on whether there is one instance of the term/item or whether there is one or multiple instances of the term/item. For example, with regard to a record that may list one or more web sites, the term "email(s)" should be interpreted in the context of an inbox: that there may be a single email in an inbox or that there may be plural emails in the inbox.

The term "social sketch" refers to an aggregation and/or representation of social communications (e.g., a social summarization) within a specified time frame with regard to one or more particular topics. Stated another way, a social sketch is a representation of what people were communicating about, via social communications, during a particular time period. The term "social communications" refers to communications that people make in a social network. Examples of social communications include, by way of illustration and not limitation, posts, tweets, messages, likes (indications of viewing an item favorably), and the like. Typically, but not exclusively, social communications are relatively short and may include embedded video, images, sounds, text, and the like.

It should be appreciated that a social sketch is not a summarization of a particular topic as may be found on various reference and/or resource sites. While a social sketch has a summary element, as indicated above a social sketch reflects an aggregation and/or summarization of social communications of people for a specified time period. In contrast, reference or resource sites and materials typically include authoritative information that describes a topic as a whole and fails to describe the topic in regard to information relevant at various time periods. Moreover, reference or resource sites and materials are typically not based on social communications but, instead, rely upon authoritative sources and references in generating and establishing an authoritative discussion of the event as a whole.

Figure 1:
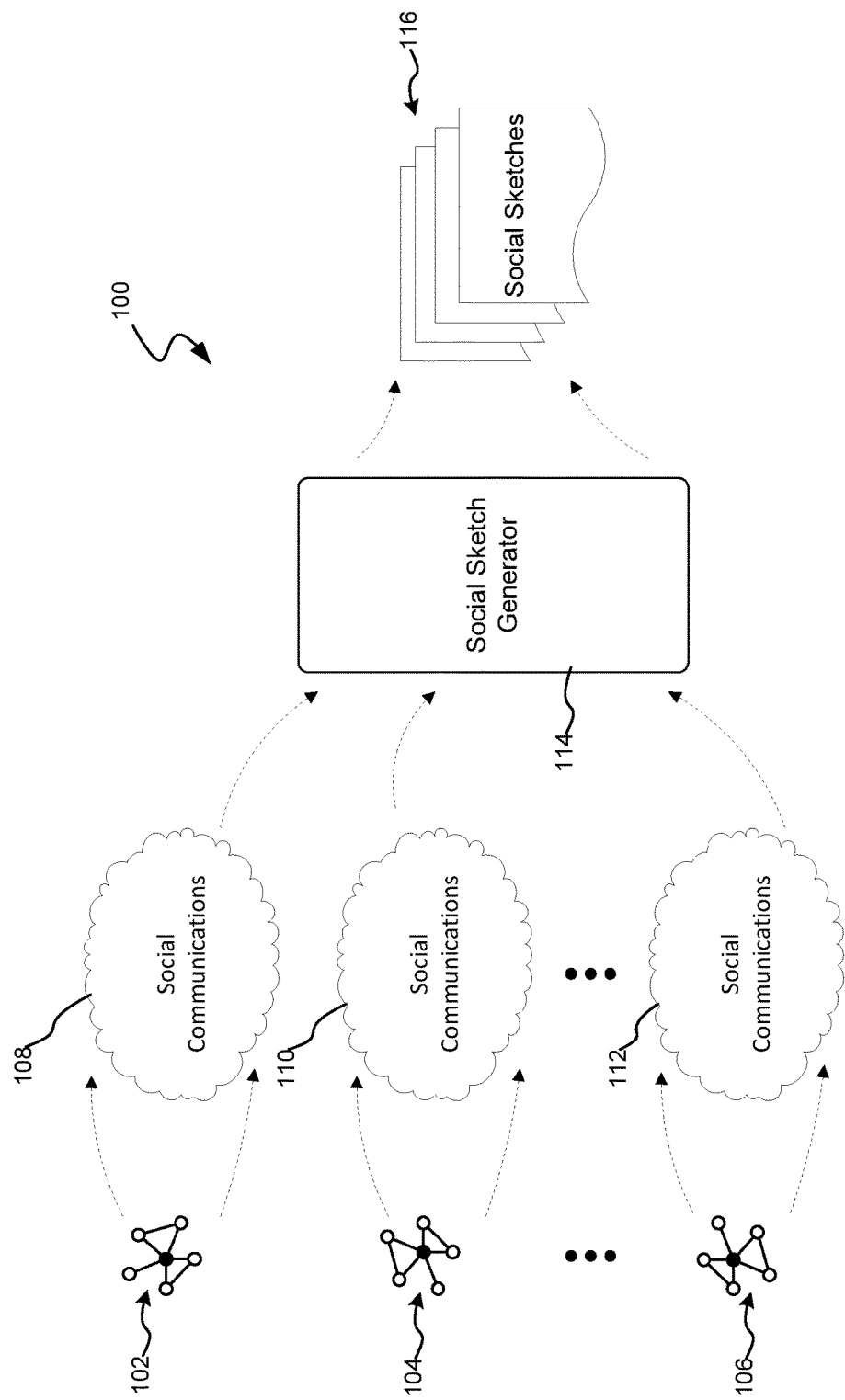
FIG. 1 is a block diagram illustrating an exemplary flow of social communications into one or more social sketches.

Turning to FIG. 1, FIG. 1 is a block diagram illustrating an exemplary flow 100 of social communications into one or more social sketches. The flow of information begins with people (not shown) communicating via one or more social networking services, such as social networking services 102-106. The result of the people communicating via the social networking services is one or more bodies of social communications, including 108-112 from each of the social networking services 102-106. According to aspects of the disclosed subject matter, these various bodies of social communications are obtained by a social sketch generator 114 where they are processed (as will be described below) to generate one or more social sketches 116. The social sketches are then stored in a data store (not shown) such that they can be retrieved and provided to a computer user in response to a query.

Figure 2:
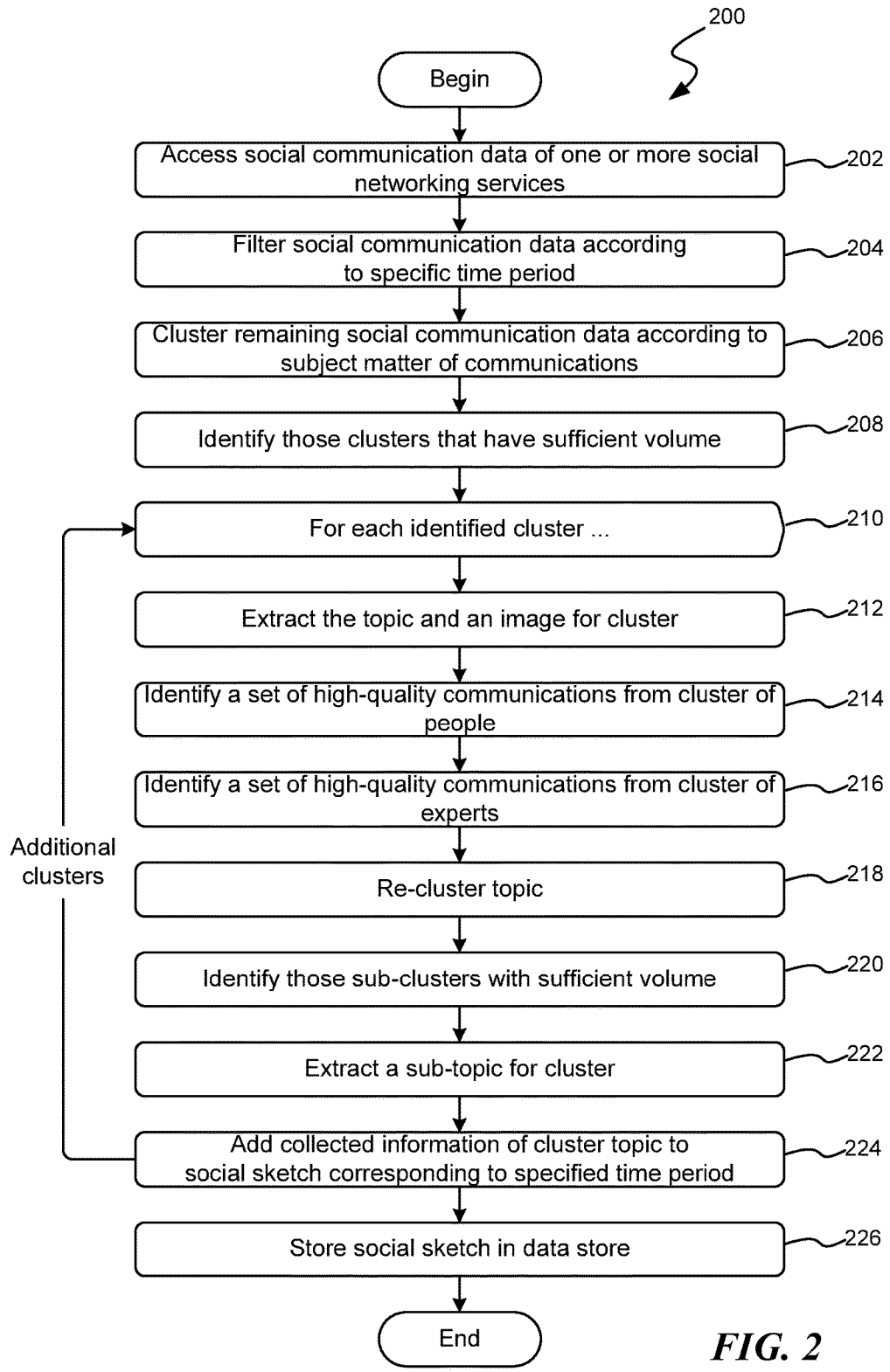
FIG. 2 is a flow diagram illustrating an exemplary routine for generating social sketches from social communications from one or more social networking services.

In regard to generating social sketches, FIG. 2 is a flow diagram illustrating an exemplary routine 200 for generating social sketches from social communications from one or more social networking services. Beginning at block 202, a social sketch generator 114 accesses or obtains social communication data comprising social communications from one or more social networking services, such as social networking services 102-106. At block 204, the social communication data is filtered according to a specific time period, i.e., social communications that occurred during a specified time period. According to one embodiment of the disclosed subject matter, the specified time period may correspond to a specified hour period such that the generated social sketch corresponds to the social communications of a particular day. Of course, the time period for which a social sketch is generated is not limited to a 24 hour period. Depending on various criteria, a specified time period may correspond to an hour, or a 12 hour period, or the like.

At block 206, the remaining social communication data is clustered according to the subject matter of the communications. According to various aspects of the disclosed subject matter, the subject matter of a social communication may be made according to a so-called "hashtag" within the social communication. As those skilled in the art will appreciate, a hashtag typically refers to the symbol "#" immediately following by text, the text being the subject matter of the hashtag. For example, "#charliehebdo" is a hashtag that makes reference to "Charlie Hebdo." Similarly, "#MemorialDay2015" is a hashtag reference to Memorial Day, 2015. Of course, the subject matter of a social communication is not limited to a hashtag within the communication as, of course, there are social communications that do not include hashtags but are relevant social communications to be included in the calculus of a social sketch. Thus, according to additional and/or alternative embodiments of the disclosed subject matter, various techniques for determining the subject matter of a social communication may be used, including by way of illustration and not limitation: dominant and/or popular N-grams of the social communications, semantic analysis of the social communications, and the like.

In addition to identifying the subject matter (one or multiple topics) of a social communication, a clustering of the social communications according to subject matter is made. As with identifying the subject matter of the social communications, clustering may be completed according to a variety of techniques that include, by way of illustration and not limitation, one or more of: Jaccard similarity (also called Jaccard index), Cosine similarity, Agglomerative clustering, K-means, DBSCAN, Term Frequency-Inverse Document Frequency (TF-IDF), and the like. As with determining the subject matter, the clustering may be based on N-grams constructed from the various social communications.

Irrespective of the particular algorithms and/or techniques used to identify the subject matter and conduct the clustering of the social communication data, the result is a set of clusters of social communications, each cluster representing a particular topic (subject matter). Thus, at block 208, those clusters that are determined to have sufficient volume are identified. Identification/selection of the clusters determines what topics are to be identified within the social sketch for the corresponding time period.

According to various aspects of the disclosed subject matter, a cluster may have "sufficient volume" if the number of social communications within the cluster exceeds a predetermined threshold, or if the number of social communications within the cluster exceeds a predetermined percentage of all of the social communications for the time period. Alternatively and/or additionally, a cluster may be identified as having "sufficient volume" according to a threshold number: i.e., a predetermined number of clusters that have the most social communications. For example, for a given time period, the social sketch generator 114 may select the top 4 clusters/topics having the most social communications. Further still, the number of clusters identified may be made according to those clusters that have the most social communication volume where, collectively, the identified clusters represent at least a predetermined percentage (e.g., 50%) of all social communications of the time period. Still further, the clusters may be identified according to multiple elements of the criteria mentioned above as well as additional selection criteria.

With regard to steps 206 and 208, according to aspects of the disclosed subject matter, one of the motivations of clustering is to identify those topics that have sufficient value. However, in various alternative embodiments, topics could be made available from an external source, i.e., external from the clustering/selection described above. For example, topics could be provided according to information derived from search logs of a search engine, according to trending topics as discovered or reported by a social networking site, or even human-curated topics. In this alternative embodiment, rather than clustering all of the social communications and selecting those clusters having significant/sufficient volume, the social communications could be filtered according to the predetermined topics. Thus (while not shown), rather than clustering and identifying topics from clusters, steps may be taken to identify (filter) the social communications that correspond to the predetermined topics.

Once the clusters (and topics) are identified, at block 210 an iteration loop is begun to iterate through the identified clusters to determine specific information of the cluster that will be maintained in the social sketch for the corresponding time period. As shown in FIG. 2, the iteration includes blocks 212-224. At block 212, the topic of the cluster is extracted. Typically, the subject matter/topic that is used in clustering the social communications. In addition to the topic, one or more images representative of the topic, as posted by one or more of the people posting the social communications regarding the topic, may also be identified. Indeed, while according to various embodiments, a single image representative of the topic may be selected, in alternative embodiments there may be plural representative images selected. According to various aspects of the disclosed subject matter, the one or more representative images may be selected from among the social communications according to various popularity criteria including, by way of illustration and not limitation, the number of social communications indicating a favorable impression of an image (e.g., "likes") during the time period, the number of times an image is shared via social communications during the time period, the number of references (e.g., hyperlinks) made to an image during the time period, and the like.

In addition to identifying the topic of the cluster and a representative image (or images), at block 214, a threshold number of high-quality social communications, as submitted by "ordinary" people, i.e., non-experts, are identified/selected from the cluster. These selected social communications from "ordinary" people are social communications from people that are not viewed as being an expert in the topic, but rather part of the general populace of people that are communicating in the social sphere. While these "ordinary" people are not viewed as being experts, some criteria may be applied to identifying and selecting high-quality communications, such as selecting communications that use grammatically correct structure, a social communication with a significant number of indications of preference, popular reposts (information originated by one person and reposted/communicated by another), the clarity and/or thoroughness of a social communication with regard to the topic, first-hand presence at a reported event, and the like. According to various embodiments of the disclosed subject matter, the threshold number of selected high quality social communications may be relatively small, such as 5 or 6. However, the actual threshold number or range of numbers may be modified up or down to meet specific implementation details and criteria.

In addition to identifying/selecting high quality social communications of "ordinary" people from the currently processed cluster, at block 216 a second threshold number of high quality social communications are identified from the cluster that were posted by people generally acknowledged by those familiar in regard to a topic, or specifically qualified according to background, training and/or experience as having expertise (experts) or highly relevant information with regard to the topic or domain of the topic. In particular, based on these and other qualifying criteria, an expert is a person (or, sometimes, an organization) that is viewed and acknowledged as having expertise and/or substantial knowledge within the particular domain, either by his or her peers within the domain, or among a significant population of people interested in the domain and/or topic. For example, if the topic is in regard to an election, a social communication in the cluster from a well-known, respected political analyst may qualify as a high quality social communication due to training and expertise in the area. As with the previous group of selected social communications, communication criteria such as clarity of information, relevance to the subject, grammatical correctness, and the like may all be applied in selecting the threshold number of social communications from the cluster of people viewed as being expert or having expertise, or highly relevant and/or specific information, in regard to the topic. According to various embodiments of the disclosed subject matter, the threshold number of high quality social communications of experts will typically be relatively small, such as 4 or 5 corresponding to the social communications of 4 or 5 experts each commenting on the topic. However, the actual threshold number or range of numbers may be modified up or down to meet specific implementation details and criteria.

While routine 200 describes obtaining high-quality social communications from both experts and non-experts in an effort to describe what "ordinary" people are saying as well as what the "experts" are saying in the particular time period, it is a reflection of one embodiment of the disclosed subject matter and should not be viewed as limiting upon the disclosed subject matter. Indeed, in alternative embodiments, a social sketch may obtain a single set of high-quality social communications from the corpus of social communications for the particular time period irrespective of whether the originating person is considered an expert or an ordinary person commenting on the topic.

As illustrated at block 218, according to the illustrated embodiment, the currently iterated cluster of social communications is re-clustered (according to one or more clustering techniques including those described above) in order to identify sub-topics within the current cluster. Thus, at block 220, those sub-clusters that include, e.g., a threshold volume of social communications within the sub-cluster, a threshold percentage of the volume of social communications of the cluster within the sub-cluster, and/or a threshold number of sub-clusters that have the greatest volume of social communications, are identified and, at block 222, the sub-topic of the identified sub-clusters are extracted.

While not shown, as an alternative to re-clustering a cluster to find sub-topics, related topics could be identified among the non-selected clusters but which are, in some manner, similar to the selected cluster for which social sketch information is to be generated. The topics corresponding to the related clusters are then used as related/sub-topic information associated with the social sketch. According to various embodiments, these related clusters may be determined by looking for similar clusters (i.e., according to the similarity measure used when clustering), whether there is some degree of overlap among the entities described in social communications, whether there are common hyperlinks among the various social communications of two or more clusters, and the like.

At block 224, the information described above identified from the currently processed cluster, i.e., a cluster set, is added to the social sketch for the corresponding specified time period. Thereafter, if there are additional main clusters to process, the iteration returns to block 210 to repeat the steps of 212-224. However, at block 224, once all of the identified clusters have been processed, such that the extracted/identified information is added to the social sketch corresponding to the specified time period, the routine 200 proceeds to block 226 where the social sketch (corresponding to the specified time period) is stored in a data store. Thereafter, the routine 200 terminates.

In regard to the various information identified from each cluster (which forms a cluster set) that is added to a social sketch for a specified time period, it should be appreciated that while the cluster sets of the illustrated routine 200 include representative images, sub-topics, high-quality expert communications and high-quality non-expert communications, in various alternative embodiments the particular sets of information may vary. For example, in one embodiment, a cluster set may comprise only a representative image and a larger amount (e.g., 10) high quality non-expert social communications. In another alternative embodiment, a cluster set may comprise a representative image for the cluster, representative images for each of the sub-topics, and high-quality social communications (without regard to whether the social communications are from experts or non-experts.) Accordingly, while routine 200 of FIG. 2 presents a routine for generating social sketches based on cluster sets of a particular configuration, this should be viewed as illustrative and not limiting upon the disclosed subject matter.

As will be readily appreciated, social communication topics tend to have a "life-span" of exchange. In other words, a particular topic will typically enjoy an extended period of time where the volume of social communications on the topic will rise to the level of being captured in a social sketch. Further, this life-span can and often will cover more than one time period in which a social sketch is generated.

While not shown in FIG. 2, according to aspects of the disclosed subject matter, when a particular topic is included in subsequent/contiguous social sketches (i.e., social sketches of contiguous time periods), the topics in the social contiguous social sketches are internally linked. One of the purposes of linkage between social sketches corresponding to a single topic covering multiple time periods is to offer or present to a viewer a sense of an evolution of the topic as discussed among various people over multiple time periods. Indeed, a viewer is provided with a discovery mechanism to explore the nuances of a particular topic as it is discussed over time. While linking a topic of multiple social sketches may be accomplished in a variety of manners, according to at least one embodiment the sketches are internally linked according to metadata describing topic/subject matter and time periods. Based on these internal links, a computer user can view a topic of a first social sketch of a first time period and easily transition to the topic in the social sketch in the next (or previous) time period. For example, assuming that "topic1" is found in the social sketch of Monday through Friday of a given week, and the specified time period of the social sketch corresponds to a day, when viewing the contents of a social sketch a computer user could easily navigate forward and backward of the life-span of the topic found in the social sketches of that particular Monday through Friday, viewing the nuanced changes of the social communications with regard to the particular topic. Links 1030 and 1032 of FIG. 10, as discussed below, illustrate a user interface in which a user can make use of the internal linkage to navigate forward and backward with regard to a recurring topic in multiple social sketches.

Figure 3:
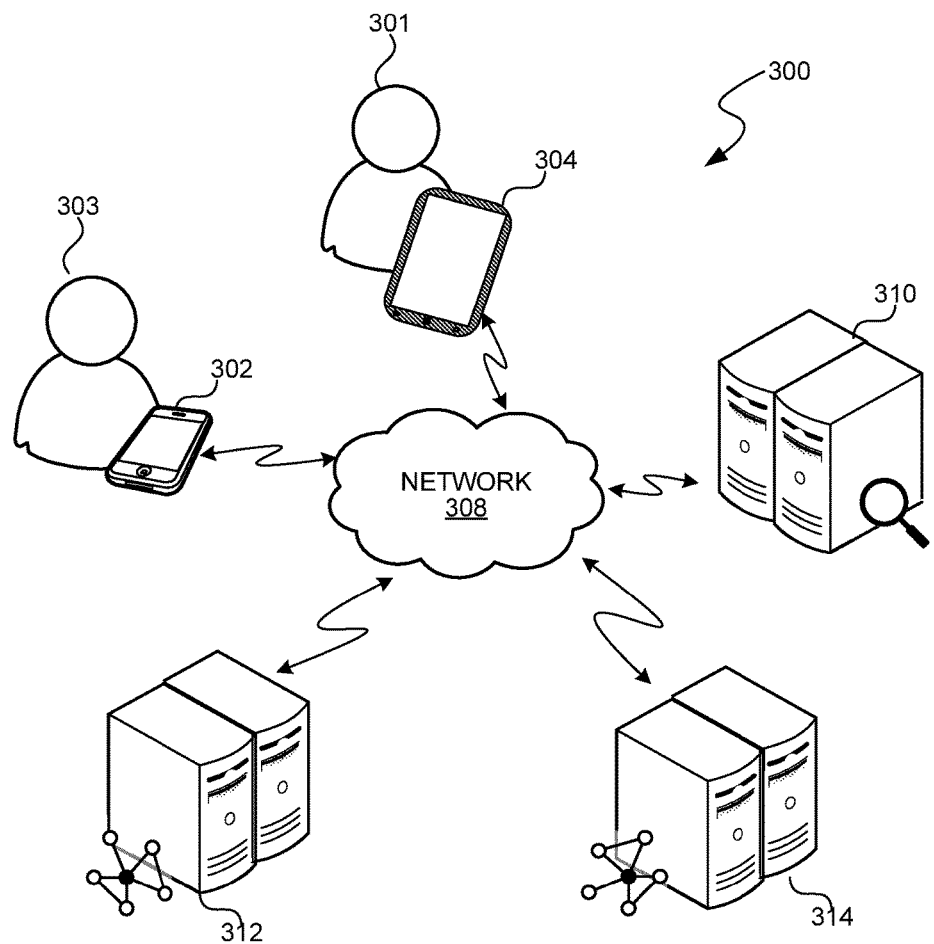
FIG. 3 is a block diagram illustrating an exemplary network environment suitable for implementing aspects of the disclosed subject matter.

Turning now to FIG. 3, FIG. 3 is a block diagram illustrating an exemplary network environment 300 suitable for implementing aspects of the disclosed subject matter. As shown in FIG. 3, various computer users, such as computer users 301 and 303 via corresponding computing devices 302 and 304, are connected to one or more social networking services 312 and 314 via a computer network 308. By way of illustration and not limitation, the computer network 308 may include the Internet, a wide area network or WAN, a local area network or LAN, and the like.

Also illustrated in the exemplary network environment 300 is a search engine 310 inter-connected to the network 308. According to aspects of the disclosed subject matter, the search engine 310 includes (or provides the services of) an exemplary social sketch generator 114, as described above. Of course, this particular configuration (a search engine 310 including or providing the functionality of a social sketch generator 114) is only one, non-limiting configuration. In alternative embodiments (not shown), a social sketch generator 114 operates as an independent service of a search engine 310. In the illustrated network environment 300, the computer users 301 303 generate social communications through connections of their corresponding computing devices 302 304 with the social networking services 312 314. In turn, the social sketch generator 114 (not shown in FIG. 3) operating in conjunction with or as part of the search engine 310 obtains the social communication data from the various social networking services 312 314, and generates social sketches corresponding to various time periods, which are then stored in a data store for later retrieval and presentation to a computer user.

Figure 4:
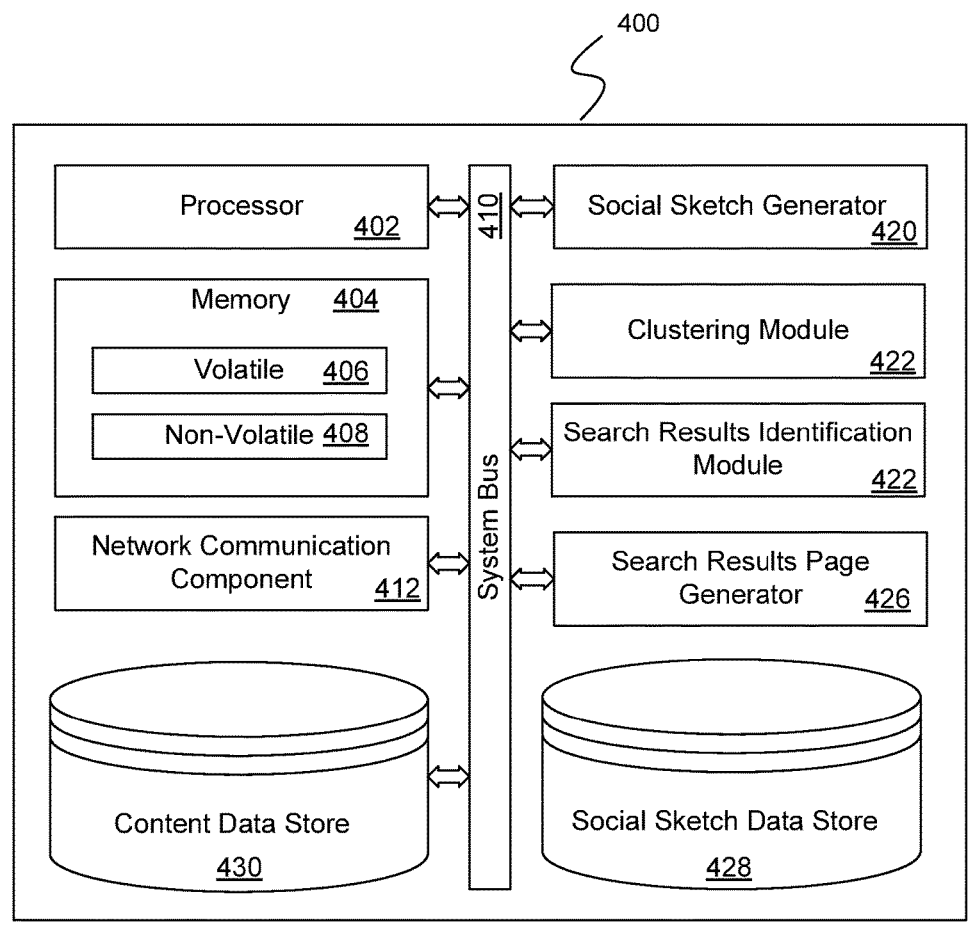
FIG. 4 is a block diagram illustrating components of an exemplary computing device suitable for implementing a search engine as described above in regard to FIG. 3.

FIG. 4 is a block diagram illustrating components of an exemplary computing device 400 suitable for implementing a search engine 310 as described above in regard to FIG. 3. The exemplary computing device 400 includes one or more processors (or processing units), such as processor 402, and a memory 404. The processor 402 and memory 404, as well as other components, are interconnected by way of a system bus 410.

The memory 404 typically (but not always) comprises both volatile memory 406 and non-volatile memory 408. Volatile memory 406 retains or stores information so long as the memory is supplied with power. In contrast, non-volatile memory 408 is capable of storing (or persisting) information even when a power supply is not available. Generally speaking, RAM and CPU cache memory are examples of volatile memory 406 whereas ROM, solid-state memory devices, memory storage devices, and/or memory cards are examples of non-volatile memory 408.

The exemplary computing device 400 further includes a network communication component 412 for interconnecting search engine 310 with other services, such as social networking services 312 and 314 over a computer network 308. The network communication component 412, which is sometimes referred to as a network interface card or NIC, communicates over a network using one or more communication protocols via a physical/tangible (e.g., wired, optical, etc.) connection, a wireless connection, or both. As will be readily appreciated by those skilled in the art, a network communication component, such as network communication component 412, is typically comprised of hardware and/or firmware components (and may also include or comprise executable software components) that transmit and receive digital and/or analog signals over a transmission medium (i.e., the network.)

As will be readily appreciated, the processor 402 executes instructions retrieved from the memory 404 (and/or from computer-readable media) in carrying out various functions, particularly in regard to responding to a single entity intent search query. The processor 402 may be comprised of any of a number of available processors such as single-processor, multi-processor, single-core units, and multi-core units.

The exemplary computing device 400 further includes a social sketch generator 420 (see also 114 of FIG. 1) that obtains social communication data from one or more social networking services 312 314 and generates social sketches from the social communications corresponding to predetermined time periods. The social sketch generator 420 utilizes a cluster module 422 that may be configured to implement one or more clustering techniques and/or algorithms to identify clusters among the social communications of a particular, specified time period. The social sketch generator 420 extracts information from the various identified clusters that have sufficient volume for a given time period to generate a corresponding social sketch 116, which is stored in a social sketch data store 428 in conjunction with the corresponding, specified time period.

The exemplary computing device 400 still further includes a search results identification component that identifies search results relevant to a received search query from a content data store 430. After identifying search results in response to a search query, a search results page generator 426 is used to generate one or more search results pages and return the results to a requesting computer user in response to a search query. In addition to including search results, the search results page generator is also configured to include one or more social sketches, according to various display formats, in the search results, as will be described in greater detail below.

Regarding the various components of the exemplary computing device 400, those skilled in the art will appreciate that these components may be implemented as executable software modules stored in the memory of the computing device, as hardware modules and/or components (including SoCs—system on a chip), or a combination of the two. Moreover, in certain embodiments each of the various components may be implemented as an independent, cooperative process or device, operating in conjunction with or on one or more computer systems and/or computing devices. It should be further appreciated, of course, that the various components described above should be viewed as logical components for carrying out the various described functions. As those skilled in the art will readily appreciate, logical components and/or subsystems may or may not correspond directly, in a one-to-one manner, to actual, discrete components. In an actual embodiment, the various components of each computing device may be combined together or distributed across multiple actual components and/or implemented as cooperative processes on a computer network.

As suggested above and according to additional aspects of the disclosed subject matter, in addition to generating and storing social sketches for particular time periods, as well as linking related sketches, a search engine 310 may be suitably configured to provide social sketches to a user in response to various user queries. Indeed, a search engine, such as search engine 310, may provide social sketches to a computer user in a variety of scenarios including, but not limited to: a computer user requesting information from a search engine 310 regarding a social sketch, i.e., requesting information regarding a particular topic (or a general inquiry) for a particular time period; a computer user requesting information from a search engine regarding a particular topic for which social sketches are available; and a computer user requesting information from a search engine regarding a particular date.

Figure 5:
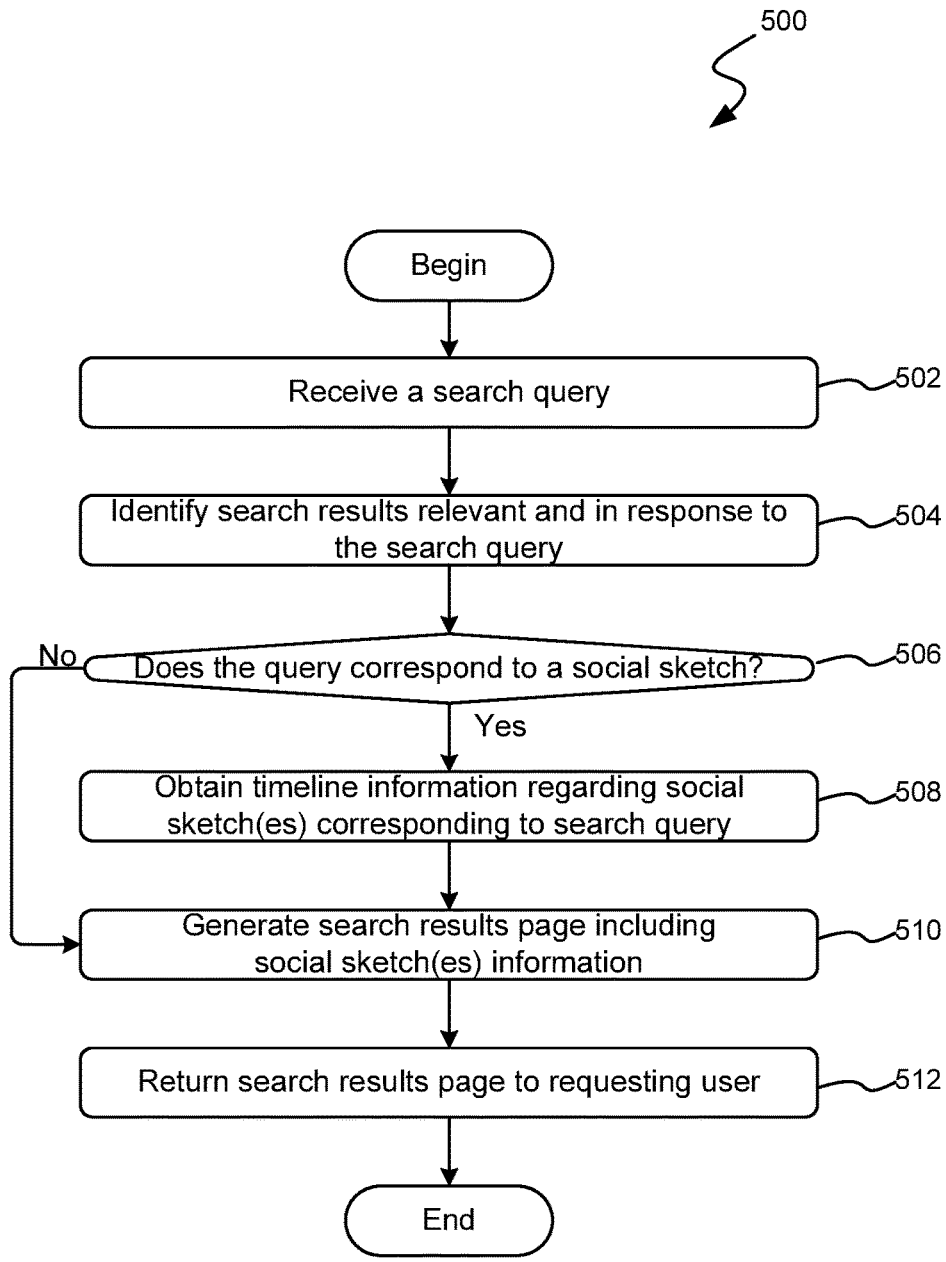
FIG. 5 is a flow diagram illustrating an exemplary routine for responding to a computer user's search query regarding a particular topic for which one or more social sketches are available.

In regard to the instance of a computer user requesting information from a search engine 310 regarding a particular topic for which social sketches are available, FIG. 5 is a flow diagram illustrating an exemplary routine 500 for responding to a computer user's search query regarding a particular topic for which one or more social sketches are available. Beginning at block 502, the exemplary routine 500 as implemented by a search engine 310, receives a search query for information regarding a particular topic. At block 504, search results that are relevant to the topic of the search query are identified. At block 506, a determination is made as to whether the particular topic of the search query corresponds to a topic of a previously generated social sketch.

If the particular topic of the search query corresponds to a topic of a social sketch that was previously generated and available to the search engine 310, at block 508 timeline information regarding particular topic as contained in one or more corresponding social sketches is obtained. As indicated above, a particular topic may be the subject matter of multiple social sketches, frequently found in consecutive time periods. Accordingly, timeline information corresponds to one or more user-actionable controls (e.g., hyperlinks) to the social sketches corresponding to the particular topic.

If, at block 506, the particular topic of the search query does not correspond to a previously generated social sketch, or after obtaining timeline information corresponding to one or more social sketches as set forth in block 508, at block 510 one or more search results pages are generated based on the obtained information: if there is no timeline information one or more "typical" search results pages corresponding to the particular topic are generated; if there is timeline information one or more search results pages corresponding to the particular topic are generated, where at least one search results page includes the timeline information. After generating the one or more search results pages, at block 512 at least one search results page is returned to the computer user in responds to the search query. Thereafter, the routine 500 terminates.

Figure 6:
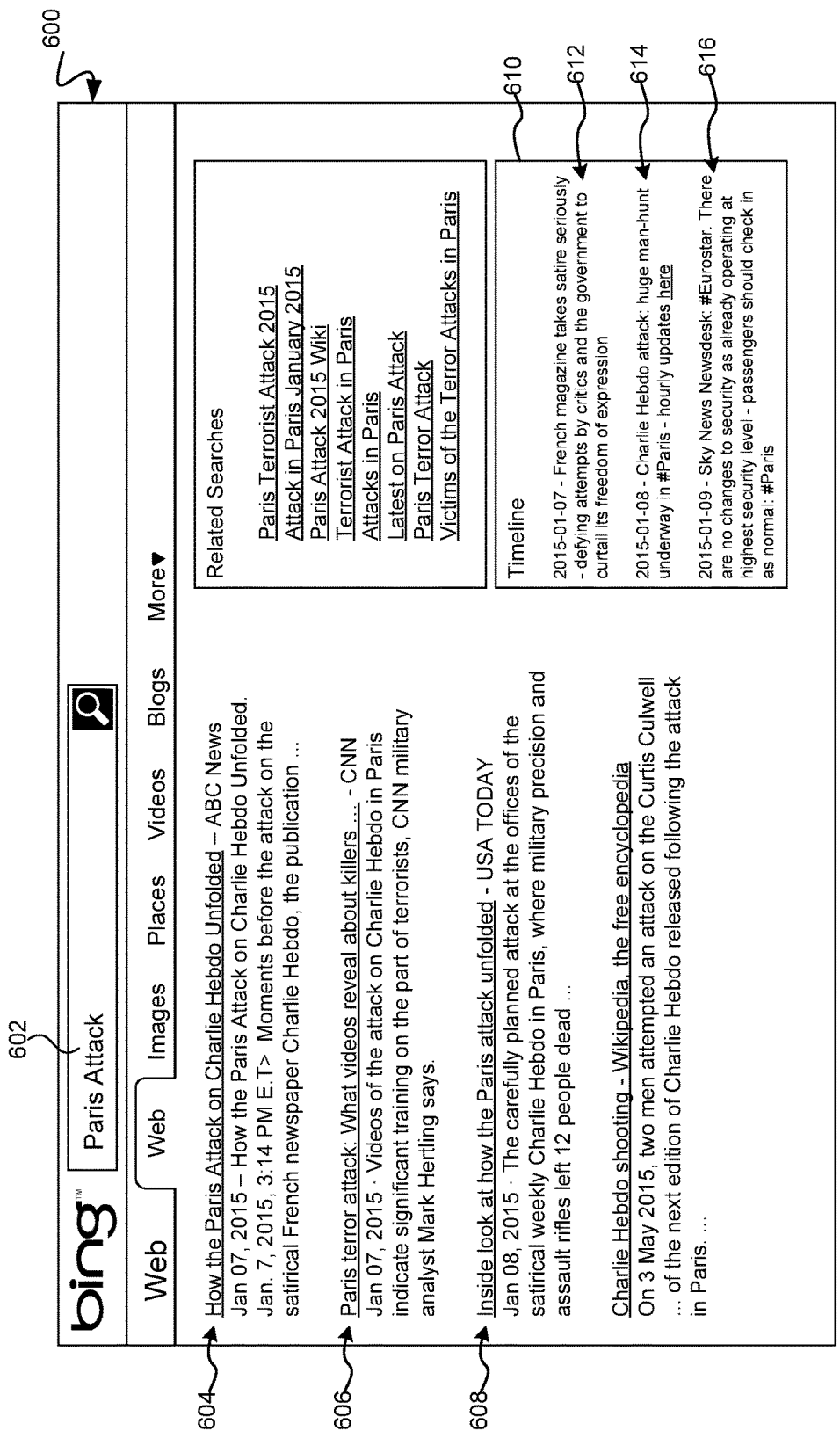
FIG. 6 is a pictorial diagram illustrating an exemplary search results page generated in response to a computer user's search query regarding a particular topic for which one or more social sketches are available.

In regard to generating a search results page to include timeline information, FIG. 6 is a pictorial diagram illustrating an exemplary search results page 600 generated by a search engine, such as search engine 310, in response to a computer user's search query regarding a particular topic 602, "Paris Attack," for which one or more social sketches are available. As illustrated in FIG. 6, in addition to identifying "typical" search results, such as search results 604-608, relevant to the topic 602, the search results page 600 is generated to also include a timeline information block 610 that includes user-actionable controls, e.g., controls 612-616, such that when activated cause the browser of the user's computer to present the corresponding topic of the social sketch (as will be illustratively presented below in regard to FIG. 10.) As shown in FIG. 6, also accompanying the user-actionable controls 612-616 are snippets representative of the topic as occurred during the particular time period of the social sketch. Of course, providing a snippet of information representative of the topic as occurred during the particular time period of the social sketch is simply one embodiment of the information that may be presented in conjunction with a user-actionable control to the corresponding social sketch. For example, in a non-limiting alternative (not shown), one of the high quality social communications of the social sketch may be presented with the user-actionable control. Further still, in alternative embodiments, a timeline information block may be generated with descriptive summaries that are not user-actionable controls.

As will be readily appreciated, a timeline provides a narrative of a topic over a period of time and it is important that high-quality, representative content for each time period is selected. Thus, in regard to the elements of the timeline information and according to aspects of the disclosed subject matter, in order to identify what information is presented for each time period of the timeline, for each time period, an evaluation of the selected expert communications of the cluster set is made to identify one of the selected expert communications as representative of the time period. This selection may be made according to various criteria, including but not limited to, the expertise, credentials, training and/or knowledge of the expert, presence at a particular event/topic, the popularity of the social communication of the selected expert (including indications of preference, re-postings, cumulative feedback of readers and/or consumers indicating that an expert's opinion or answer to a question was useful/helpful, and the like), etc. Additionally, as a timeline presents an evolution of a topic over multiple time periods (as discussed in social communications), it is important that the selected expert communication for a time period adds value to the timeline. In other words, each selected expert communication should add information to the timeline. Thus, an effort to avoid duplicate timeline "entries" should be avoided. In this manner, the latest posting corresponding to the particular time period within the timeline displays/reflects some aspect/essence of the social communications of that time period with regard to the topic of the timeline and adds information regarding the topic to the timeline's viewer.

Figure 7:
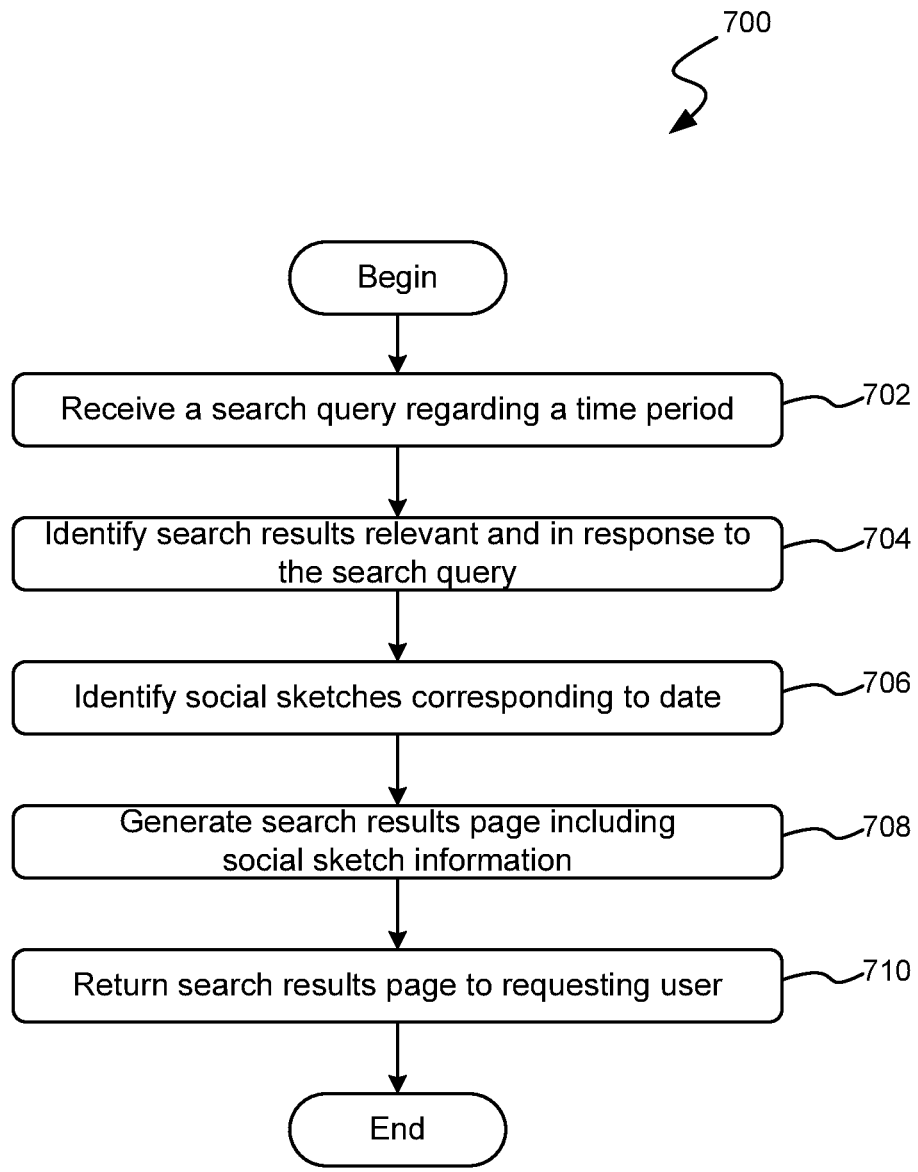
FIG. 7 is a flow diagram illustrating an exemplary routine for responding to a computer user's search query regarding information of a date or time period.

In regard to the instance of a computer user requesting information from a search engine, such as search engine 310, regarding a particular date or time period, FIG. 7 is a flow diagram illustrating an exemplary routine 700 for responding to a computer user's search query regarding information of a date or time period. Beginning at block 702, the search engine receives a search query, such as "what happened on Jan. 7, 2015?", regarding a particular time period (which may correspond to a date). A search query that asks, "what happened on . . . ?" may be referred to as a temporal intent query, i.e., indicating that the requesting user has clearly manifested a temporal/time-based intent with regard to a particular time period. At block 704, the search engine 310 identifies search results relevant to the search query. At least some of the search results relevant to the search query comprise results of topics not found with the social sketch corresponding to the time period. At block 706, the search engine also identifies the social sketches that have been generated for the requested time period. At block 708, one or more search results pages are generated to include both the identified search results as well as a social sketch block that includes user-actionable controls for each of the social sketches of the time period, where activation of a user-actionable control causes the presentation of the corresponding social sketch to the computer user. After generating the one or more search results pages, at block 710, at least a first of the one or more search results pages is returned to the computer user in response to the search query. Thereafter, the routine 700 terminates.

Figure 8:
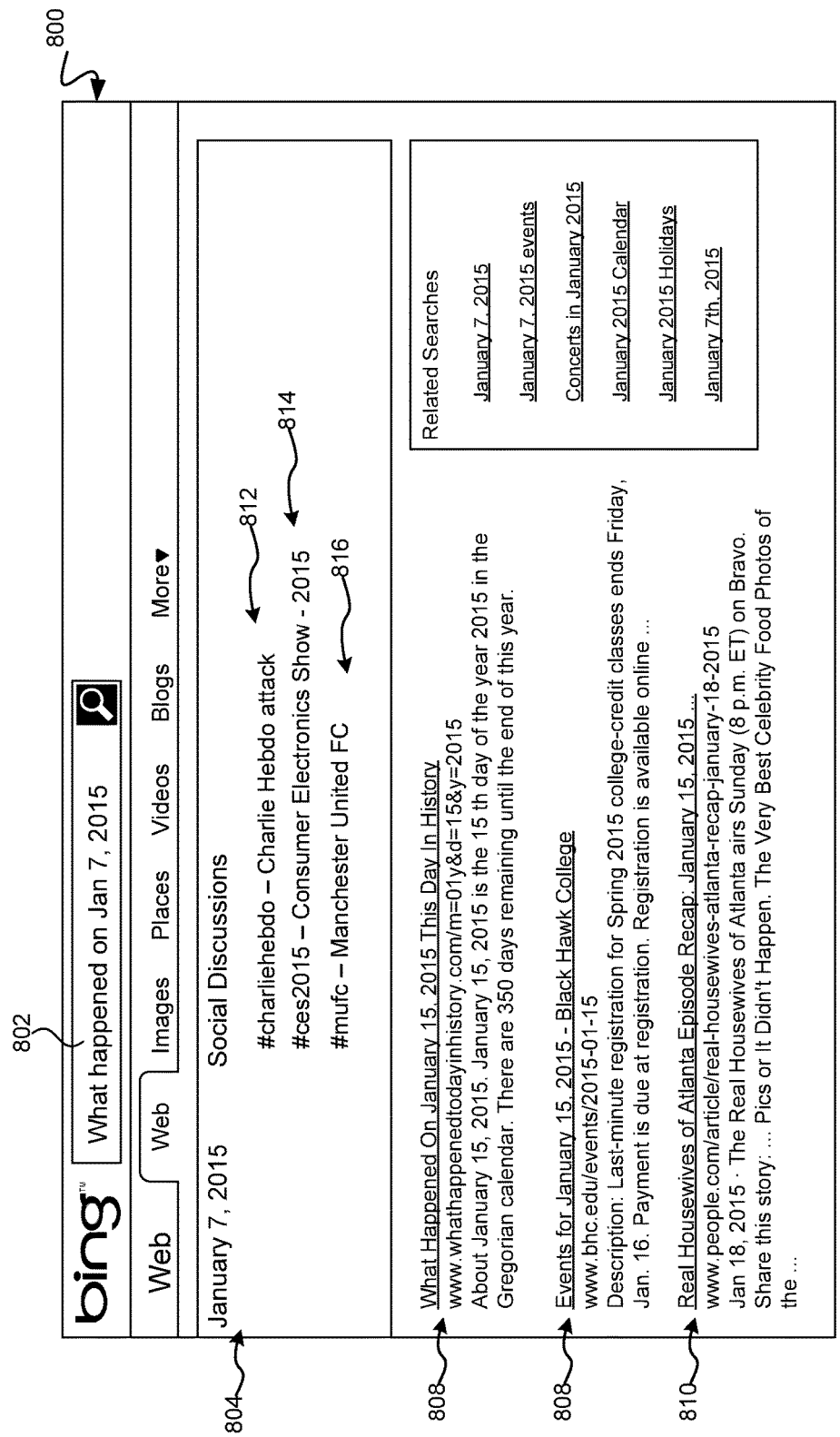
FIG. 8 is a pictorial diagram illustrating an exemplary search results page generated by a search engine in response to a computer user's search query regarding a particular time period.

In regard to generating a search results page to include a social sketch block as described above in regard to routine 700, FIG. 8 is a pictorial diagram illustrating an exemplary search results page 800 generated by a search engine, such as search engine 310, in response to a computer user's search query regarding a particular time period 802, "Jan. 7, 2015." As illustrated in FIG. 8, in addition to identifying search results that the search engine obtains from its content index regarding and relevant to the particular date, such as search results 806-810, relevant to the topic 802, the search results page 800 is generated to also include a social sketch block 804 that includes user-actionable controls 812-816, each of which corresponds to a social sketch topic generated in regard to the particularly specified time period. According to aspects of the disclosed subject matter, each user-actionable control is configured to cause the browser of the user's computer to present the corresponding social sketch. According to one embodiment (as shown in FIG. 8), the hashtag corresponding to the topic and the topic itself are part of the user-actionable control to illustrate to the computer user the activity of the time period.

Figure 9:
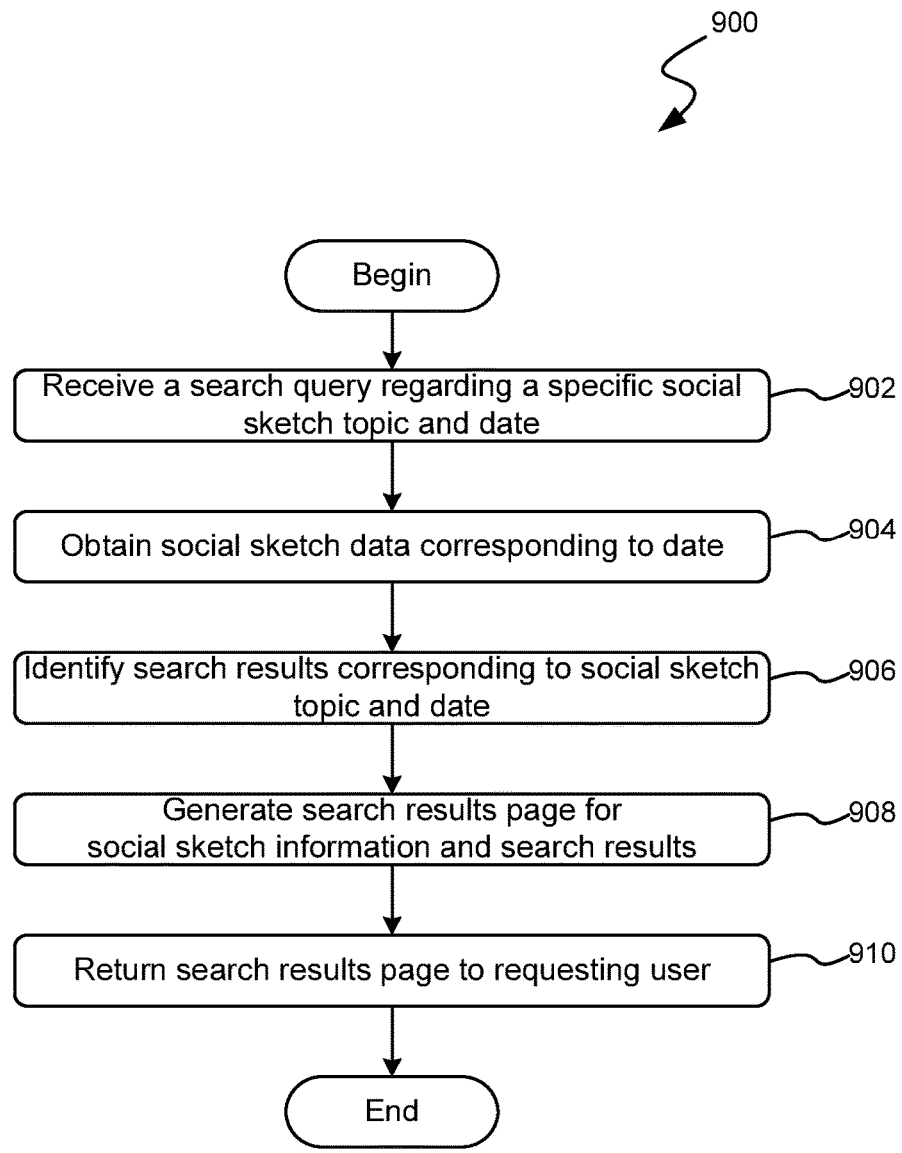
FIG. 9 is a flow diagram illustrating an exemplary routine for responding to a computer user's search query regarding information corresponding to a particular topic for a particular time period.

In regard to the instance of a computer user requesting information from a search engine 310 regarding a social sketch, i.e., requesting information regarding a particular topic for a particular time period, FIG. 9 is a flow diagram illustrating an exemplary routine 900 for responding to a computer user's search query regarding information corresponding to a particular topic for a particular time period. Beginning at block 902, the search engine (such as search engine 310) receives a search query regarding a particular topic and time period, such as "#charliehebdo Jan. 7, 2015." At block 904, the social sketch corresponding to the identified topic and time period is obtained. At block 906, in addition to the social sketch information, search results relevant to the topic (which are not part of the social sketch) and the particular time period may also be identified and obtained. At block 908, the search engine generates one or more search results according to the social sketch information as well as any search results that are identified/obtained. At block 910, at least a first of the one or more search results pages are returned to the requesting computer user. Thereafter, the routine 900 terminates.

Figure 10:
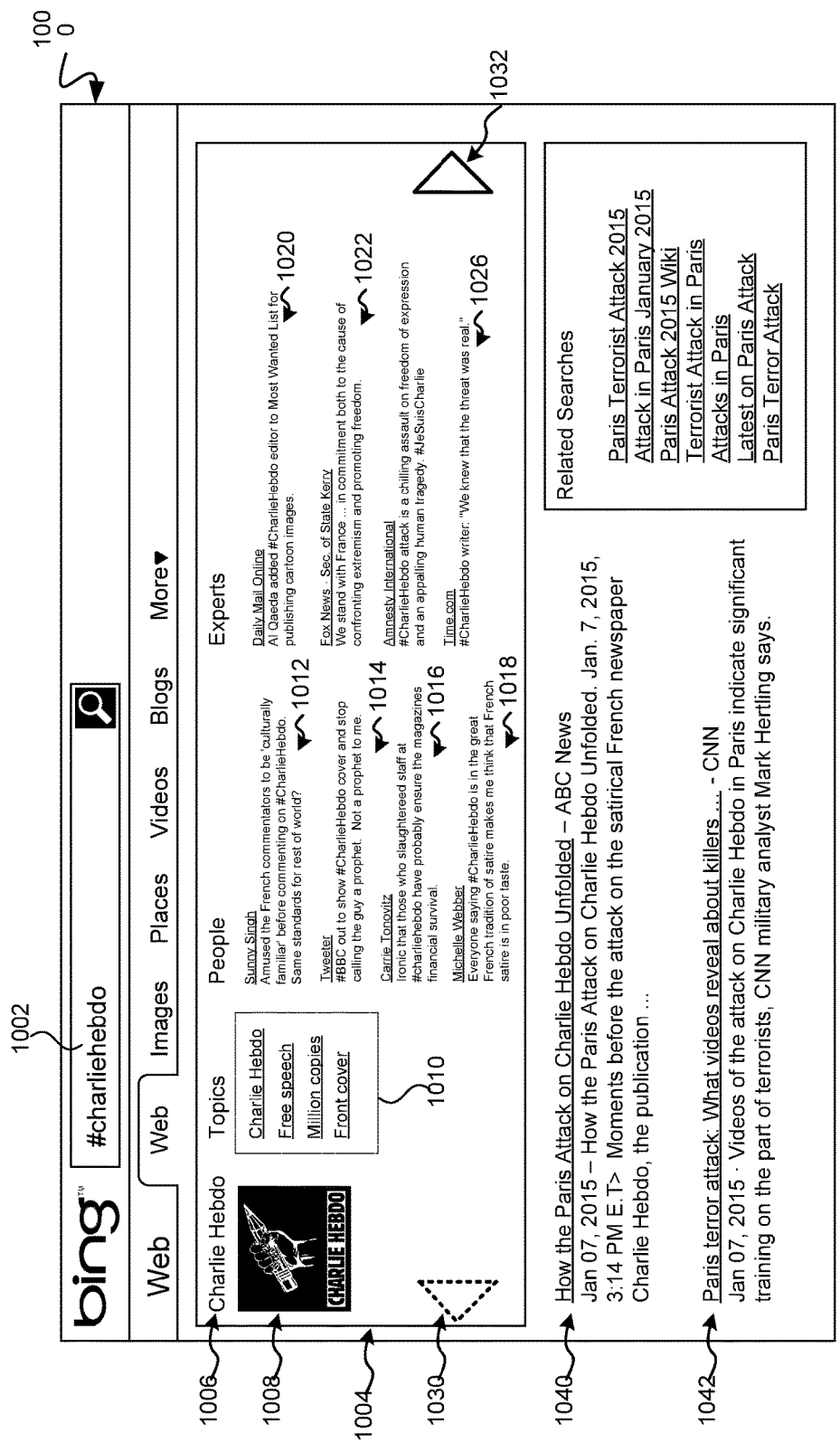
FIG. 10 is a pictorial diagram illustrating an exemplary search results page generated by a search engine in response to a computer user's search query regarding a particular topic and time period.

In regard to generating a search results page in response to a search query regarding a particular topic and time period, as described above in regard to routine 900, FIG. 10 is a pictorial diagram illustrating an exemplary search results page 1000 generated by a search engine, such as search engine 310, in response to a computer user's search query regarding a particular topic and time period 1002, "#charliehebdo Jan. 7, 2015." As illustrated in FIG. 10, in addition to identifying search results, e.g., search results 1040-1042 that the search engine obtains from its content index regarding and relevant to the particular time period and topic, the search results page 1000 is generate to also include a social sketch view 1004 corresponding to the requested social sketch. As shown in FIG. 10, an exemplary social sketch view 1004 includes 4 sections: a topic/image section in which the topic 1002 1006 and representative image 1008 (or images if there are plural) of the corresponding social sketch are shown; a topics section in which user-actionable controls are presented, each user-actionable control corresponding to a search query for the sub-topics (or related topics) identified in regard to the social sketch (as discussed above in regard to routine 200 of FIG. 2); a people section in which the high-quality social communications for the topic of the social sketch are presented, such as social communications 1012-1018; and an experts section in which the high-quality social communications of the identified experts are presented, such as social communications 1020-1024. Additionally, link controls are provided in order to enable a computer user to navigate between social sketches of consecutive time periods, such as links 1030 and 1032. As shown in FIG. 10, the link 1030 is displayed in dashed lines indicating that there is no previous social sketch corresponding to the topic, while link 1032 is displayed in solid lines indicating that a subsequent social sketch corresponding to the topic is available.

In addition to generating social sketches based on clusters of social communications that have sufficient volume for a particular time period, aspects of the disclosed subject matter may be further applied to specific, targeted information. In other words, rather than generating social sketches from the entire corpus of social communications of a particular time period, a targeted social sketch may be generated from a filtered set of the corpus of social communications, filtered according to a particular, targeted feature. For example, an interest group may desire to determine and track what people are saying in the social sphere with regard to their particular area of interest. Accordingly, the interest group may request that the search engine (or another service configured to generate social sketches) provide social sketches regarding the area of interest over one or more periods of time.

Figure 11:
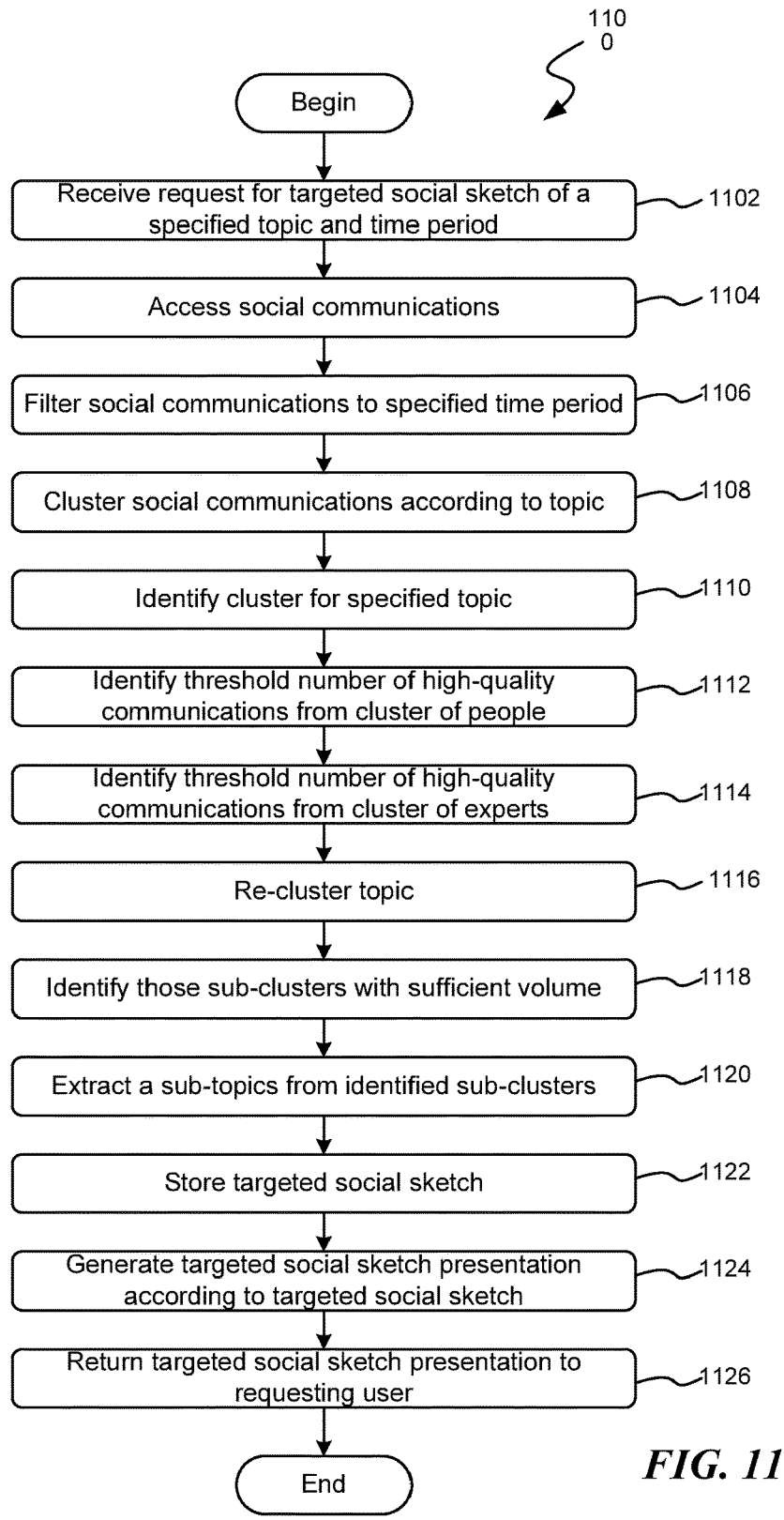
FIG. 11 presents a flow diagram illustrating an exemplary routine for generating a targeted social sketch for a predetermined time period.

While the routine 200 is generally applicable, FIG. 11 presents a flow diagram illustrating an exemplary routine 1100 for generating a targeted social sketch for a predetermined time period. Beginning at block 1102, the service (such as the search engine 310) receives a request for a targeted social sketch with regard to a particular topic and time period. At block 1104, the corpus of social communications is accessed. At block 1106, the social communications are limited to the requested time period. At block 1108, the social communications are clustered according to topic, as described above in regard to block 206 of FIG. 2.

At block 1110, the clusters of social communications are limited to that cluster corresponding to the particular, requested topic. Stated differently, the cluster corresponding to the particularly requested topic is identified. At block 1112, a target threshold number of high-quality social communications from the people within the identified cluster are identified. According to aspects of the disclosed subject matter, the target threshold number of high-quality social communications may differ from the threshold number of high-quality social communications discussed in regard to FIG. 2. Similarly, at block 1114, a target threshold number of high-quality social communications from experts within the identified cluster are identified. According to aspects of the disclosed subject matter, these target threshold numbers of high-quality social communications may differ from the threshold number of high-quality social communications discussed in regard to FIG. 2.

According to aspects of the disclosed subject matter, at block 1116 the identified cluster of social communications is re-clustered to identify sub-topics within the identified cluster. At block 1118, the sub-clusters that have a sufficient, threshold volume of social communications are identified and, at block 1120, a sub-topic for each of the identified sub-clusters is extracted.

At block 1122, the saved information is saved as a targeted social sketch. At block 1124, a targeted social sketch presentation is generated according to the targeted social sketch and, at block 1126, the targeted social sketch presentation is returned to the requesting party.

In regard to routine 1100, while the steps of this routine are presented as being conducted in regard to a single request, in fact in various embodiments a request may be made of a service that provides targeted social sketches such that the service need not necessarily receive a "request" for each targeted social sketch presentation that is generated. Still further, a single request may identify multiple time periods for which a targeted social sketch is requested, and steps within routine 1100 may be utilized. Accordingly, while routine 1100 is presented as a response to a single request for a targeted social sketch, this is simply one illustration/embodiment of the novel and inventive aspects contained therein.

Regarding routines 200, 500, 700, 900 and 1100 described above, as well as other processes described herein, while these routines/processes are expressed in regard to discrete steps, these steps should be viewed as being logical in nature and may or may not correspond to any actual and/or discrete steps of any particular implementation. Also, the order in which these steps are presented in the various routines and processes, unless otherwise indicated, should not be construed as the only order in which the steps may be carried out. Further, in some instances, some of the steps of these routines may be omitted. Those skilled in the art will recognize that the logical presentation of steps is sufficiently instructive to carry out aspects of the claimed subject matter irrespective of any particular language in which the logical instructions/steps are embodied.

Of course, while these routines include various novel features of the disclosed subject matter, other steps (not listed) may also be carried out in the execution of the subject matter set forth in these routines. Those skilled in the art will appreciate that the logical steps of these routines may be combined together or be comprised of multiple steps. Any or all of the steps of the above-described routines may be carried out in parallel or in series. Often, but not exclusively, the functionality of the various routines is embodied in software (e.g., applications, system services, libraries, and the like) that is executed on one or more processors of computing devices, such as the computing device described in regard FIG. 5 below. Additionally, in various embodiments all or some of the various routines may also be embodied in executable hardware modules including, but not limited to, system on chips, codecs, specially designed processors and/or logic circuits, and the like on a computer system.

These routines/processes are typically embodied within executable code modules comprising routines, functions, looping structures, selectors such as if-then and if-then-else statements, assignments, arithmetic computations, and the like. However, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar beneficial results.

While many novel aspects of the disclosed subject matter are expressed in routines or processes embodied within applications (also referred to as computer programs), apps (small, generally single or narrow purposed, applications), executable modules and/or methods, these aspects may also be embodied as computer-executable instructions stored by computer-readable media, also referred to as computer-readable storage media, which are articles of manufacture. As those skilled in the art will recognize, computer-readable media can host, store and/or reproduce computer-executable instructions and data for later retrieval and/or execution. When the computer-executable instructions that are hosted or stored on the computer-readable storage devices are executed, the execution thereof causes, configures and/or adapts the executing computing device to carry out various steps, methods and/or functionality, including those steps, methods, and routines described above. Examples of computer-readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random access memory (RAM), read-only memory (ROM), memory cards, thumb drives, and the like; cloud storage (i.e., an online storage service); and the like. While computer-readable media may deliver the computer-executable instructions (and data) to a computing device for execution via various transmission means and mediums, including carrier waves and/or propagated signals, for purposes of this disclosure computer readable media expressly excludes carrier waves and/or propagated signals.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A method for generating a social sketch corresponding to a time period in response to a request, the method implemented by at least one processor having executable instructions that, when executed, perform operations comprising:

obtaining social communications from a social networking service, the social communications including social communications generated during a first time period;

filtering obtained social communications according to the first time period such that the filtered social communications correspond to the social communications generated during the first time period;

clustering the filtered social communications according to the subject matter of the social communications to generate a plurality of clusters of filtered social communications, each cluster corresponding to a topic;

identifying a set of clusters of the plurality of clusters of social communications comprising identifying those clusters of the plurality of clusters of social communications that have a sufficient volume of social communications within the cluster, each cluster of the set of the clusters being an identified cluster, and wherein the plurality of clusters of social communications that have a sufficient volume of social communications within the cluster comprises a predetermined number of clusters that have the greatest number of social communications of the plurality of clusters;

for each identified cluster:
  extracting a topic from the identified cluster according to the subject matter of the social communications of the identified cluster;
  identifying a non-expert set of high-quality communications from the identified cluster, the non-expert set of high-quality communications corresponding to social communications of non-experts on the topic of the identified cluster;
  identifying an expert set of high-quality communications from the identified cluster, the expert set of high-quality communications corresponding to social communications of experts on the topic of the identified cluster;
  wherein the topic, the non-expert set of high-quality communications, and the expert set of high-quality communications comprise a cluster set of the identified cluster; and
  storing the cluster sets of each of the identified clusters as the social sketch corresponding to the identified time period.

2. The computer implemented method of claim 1 further comprising, for each of the identified clusters:
  re-clustering the identified cluster of social communications;
  identifying a set of sub-clusters of the identified cluster; and
  extracting a sub-topic from each of the identified sub-clusters of the set of sub-clusters of the identified cluster;
  wherein the topic, the non-expert set of high-quality communications, the expert set of high-quality communications, and the extracted sub-topics comprise a topic set of the identified cluster.

3. The computer implemented method of claim 2 further comprising, for each of the identified clusters:
  identifying a representative image of the identified cluster from the social communications of the identified cluster;
  wherein the topic, the non-expert set of high-quality communications, the expert set of high-quality communications, the extracted sub topics, and the representative image comprise a topic set of the identified cluster.

4. The computer implemented method of claim 3, wherein the plurality of clusters of social communications that have a sufficient volume of social communications within the cluster comprises those clusters whose volume of social communications within the cluster exceeds a predetermined number.

5. The computer implemented method of claim 3, wherein the plurality of clusters of social communications that have a sufficient volume of social communications within the cluster comprises those clusters whose volume of social communications within the cluster exceeds a predetermined percentage of all of the social communications for the time period.

6. The computer implemented method of claim 3, wherein identifying a set of sub clusters of the identified cluster comprises identifying the set of sub clusters according to any one or more of:
  a threshold volume of social communications within the sub cluster,
  a threshold percentage of the volume of social communications of the cluster within the sub cluster, or
  a threshold number of sub-clusters that have the greatest volume of social communications within the sub cluster.

7. The computer implemented method of claim 2 further comprising:
  receiving a search query regarding the time period;
  identifying a set of search results relevant to the time period, the set of search results including results of topics not found with the social sketch corresponding to the time period;
  obtaining the social sketch corresponding to the time period;
  generating a search results page, the search results page including:
    at least some of the identified set of results relevant to the time period; and
    a social sketch view, the social sketch view including a plurality of user actionable controls, each user actionable control identifying and corresponding to a social sketch topic of the social sketch corresponding to the time period; and
  returning the generated search results page to a requesting party in response to the search query.

8. The computer implemented method of claim 2 further comprising:
  receiving a search query regarding a first topic;
  identifying a set of search results relevant to the first topic;
  determining whether the first topic corresponds to a topic of the social sketch and, upon determining that the first topic corresponds to a topic of the social sketch:
    generating a search results page, the search results page including:
      some of the identified set of results relevant to the time period; and
      a timeline information block, the timeline information block including at least one user actionable control, the at least one user actionable control comprising a snippet of information representative of the first topic as occurred during the time period of the social sketch; and
  returning the generated search results page to a requesting party in response to the search query.

9. The computer implemented method of claim 2 further comprising:
  receiving a search query regarding a first topic and the time period, wherein the first topic corresponds to a topic of the social sketch;
  identifying a set of search results relevant to the first topic;
  generating a search results page, the search results page including:
    at least some of the identified set of results relevant to the first topic; and
    a social sketch view, the social sketch view comprising the topic of the social sketch, at least some of the non-expert set of high quality communications from the identified cluster, and at least some of the expert set of high quality communications for the identified cluster; and returning the generated search results page to a requesting party in response to the search query.

10. The computer implemented method of claim 9, wherein the social sketch view further comprises a user actionable control linking the current social sketch view to a social sketch view corresponding to a social sketch of another time period that includes the first topic, wherein the user actionable control linking the current social sketch view to a social sketch view corresponding to a social sketch of another time period is configured to cause to replace the social sketch view corresponding to the first topic of a social sketch of the time period with a social sketch view corresponding to the first topic of a social sketch of the another time period.

11. A computing device configured to generate a social sketch corresponding to a time period, the computing device comprising a processor and a memory, and further comprises additional components for generating the social sketch, the additional components comprising:

a social sketch generator configured to generate a social sketch from social communications obtained from one or more social networking services;

a clustering module configured to cluster a corpus of social communications according to similarity; and a social sketch data store;

wherein, in operation, the social sketch generator:

obtains a corpus of social communications from one or more social networking services over a network via a network communication component, the corpus of social communications including social communications generated during a first time period;

filters the obtained corpus of social communications according to the first time period such that the filtered social communications correspond to the social communications of the corpus of social communications generated during the first time period;

clusters, by way of the clustering module, the filtered social communications according to the subject matter of the social communications to generate a plurality of clusters of filtered social communications;

identifies a set of clusters of the plurality of clusters of social communications comprising identifying those clusters of the plurality of clusters of social communications that have a sufficient volume of social communications within the cluster, wherein the plurality of clusters of social communications that have a sufficient volume of social communications within the cluster comprises a predetermined number of clusters that have the greatest number of social communications of the plurality of clusters, each cluster of the set of the clusters being an identified cluster;

for each identified cluster:

extracts a topic from the identified cluster according to the subject matter of the social communications of the identified cluster;

identifies a representative image of the identified cluster from the social communications of the identified cluster;

identifies a non-expert set of high-quality communications from the identified cluster, the non-expert set of high-quality communications corresponding to social communications of non-experts on the topic of the identified cluster;

identifies an expert set of high-quality communications from the identified cluster, the expert set of high-quality communications corresponding to social communications of experts on the topic of the identified cluster;

re-clusters, via the clustering module, the identified cluster of social communications;

identifies a set of sub-clusters of the identified cluster; and extracts a sub-topic from each of the identified sub-clusters of the set of sub-clusters of the identified cluster;

wherein the topic, the non-expert set of high-quality communications, the expert set of high-quality communications, the extracted sub-topics, and the representative image comprise a cluster set of the identified cluster; and stores the cluster sets of each of the identified clusters as the social sketch corresponding to the identified time period in the social sketch data store.

12. The computing device of claim 11, wherein the plurality of clusters of social communications that have a sufficient volume of social communications within the cluster comprises those clusters whose volume of social communications within the cluster exceeds a predetermined number.

13. The computing device of claim 11, wherein the plurality of clusters of social communications that have a sufficient volume of social communications within the cluster comprises those clusters whose volume of social communications within the cluster exceeds a predetermined percentage of all of the social communications for the time period.

14. The computing device of claim 11, wherein identifying a set of sub clusters of the identified cluster comprises identifying the set of sub clusters according to any one or more of:

a threshold volume of social communications within the sub cluster, a threshold percentage of the volume of social communications of the cluster within the sub cluster, or a threshold number of sub-clusters that have the greatest volume of social communications within the sub cluster.

15. A method for providing a targeted social sketch in response to a request, the method implemented by at least one processor having executable instructions that, when executed, perform operations comprising:

receiving a request for a targeted social sketch corresponding to a first topic and a time period;

accessing social communications from one or more social networking services;

filtering the social communications according to the time period, the results being social communications generated during the time period;

clustering the social communications according to topics as found in the subject matter of the social communications;

identifying a cluster of social communications corresponding to the first topic from a plurality of clusters of social communications having a sufficient volume of social communication within the cluster, and wherein the plurality of clusters of social communications that have a sufficient volume of social communications within the cluster comprises a predetermined number of clusters that have the greatest number of social communications of the plurality of clusters;

identifying a non-expert set of high-quality communications from the identified cluster, the non-expert set of high-quality communications corresponding to social communications of non-experts on the first topic of the identified cluster;

identifying an expert set of high-quality communications from the identified cluster, the expert set of high-quality communications corresponding to social communications of experts on the first topic of the identified cluster;

storing the targeted social sketch, wherein the targeted social sketch comprises the first topic, the non-expert set of high-quality communications, and the expert set of high-quality communications;

generating a targeted social sketch presentation according to the targeted social sketch; and returning the targeted social sketch presentation to a requesting party in response to the request.

16. The computer implemented method of claim 15 further comprising:

re-clustering the identified cluster of social communications;

identifying a set of sub-clusters of the identified cluster; and extracting a sub-topic from each of the identified sub-clusters of the set of sub-clusters of the identified cluster;

wherein the targeted social sketch comprises the first topic, the non-expert set of high-quality communications, the expert set of high-quality communications, and the extracted sub-topics.

* * * * *